(12) United States Patent
Fang et al.

(10) Patent No.: US 8,913,532 B1
(45) Date of Patent: Dec. 16, 2014

(54) CONFIGURABLE GUARD TIME FOR WIRELESS NETWORKS

(75) Inventors: Yonggang Fang, San Diego, CA (US); Wenfeng Zhang, San Diego, CA (US); Yu Xin, Shenzhen (CN)

(73) Assignee: ZTE (USA) Inc., Morristown, NJ (US)

( * ) Notice: Subject to any disclaimer, the term of this patent is extended or adjusted under 35 U.S.C. 154(b) by 0 days.

(21) Appl. No.: 12/415,982

(22) Filed: Mar. 31, 2009

Related U.S. Application Data

(60) Provisional application No. 61/041,190, filed on Mar. 31, 2008.

(51) Int. Cl.
*H04L 5/14* (2006.01)
*H04J 3/00* (2006.01)

(52) U.S. Cl.
USPC .......................... 370/294; 370/280; 370/329

(58) Field of Classification Search
USPC ......... 370/276, 277, 280, 294, 329, 336, 328, 370/330; 375/130, 131, 140, 141, 146, 147, 375/259, 260; 455/403, 422.1, 450
See application file for complete search history.

(56) References Cited

U.S. PATENT DOCUMENTS

| | | | |
|---|---|---|---|
| 7,418,065 B2 * | 8/2008 | Qiu et al. ...................... | 375/343 |
| 2008/0232238 A1 * | 9/2008 | Agee ................................ | 370/208 |
| 2009/0067524 A1 * | 3/2009 | Li ................................... | 375/260 |
| 2009/0109919 A1 * | 4/2009 | Bertrand et al. ............... | 370/330 |
| 2010/0248732 A1 * | 9/2010 | Baldemair et al. ............ | 455/450 |

* cited by examiner

*Primary Examiner* — Michael Thier
*Assistant Examiner* — Feben M Haile
(74) *Attorney, Agent, or Firm* — Perkins Coie LLP

(57) ABSTRACT

Techniques, apparatuses, and systems for wireless communications comprising can include operating a wireless communication system that provides multiple guard time values for different deployment configurations, mapping the guard time values to cyclic prefix (CP) values to reduce an acquisition complexity and reduce an initial synchronization time of a mobile station, and communicating a selected guard time value to a mobile station by transmitting a signal using a cyclic prefix value corresponding to the selected guard time value.

22 Claims, 6 Drawing Sheets

| Conf. Mode | CP (512, 1024, 2048) | | FL/RL Guard Time (512, 1024, 2048) | | RL/FL Guard Time (512, 1024, 2048) | | Super Frame Duration |
|---|---|---|---|---|---|---|---|
| | chips | μs | chips | μs | chips | μs | ms |
| 0 | 32, 64, 128 | 6.51 | 384, 768, 1536 | 78.12 | 80, 160, 320 | 16.28 | 23.07 |
| 1 | 64, 128, 256 | 13.02 | 512, 1024, 2048 | 104.18 | 80, 160, 320 | 16.28 | 24.45 |
| 2 | 96, 192, 284 | 19.53 | 640, 1280, 2560 | 130.21 | 80, 160, 320 | 16.28 | 25.83 |
| 3 | 128, 256, 512 | 26.04 | 768, 1536, 3072 | 156.25 | 80, 160, 320 | 16.28 | 27.20 |

| Conf. Mode | CP | | FL/RL Guard Time | | RL/FL Guard Time | | Super Frame Duration |
|---|---|---|---|---|---|---|---|
| | chips (512, 1024, 2048) | μs | chips (512, 1024, 2048) | μs | chips (512, 1024, 2048) | μs | ms |
| 0 | 32, 64, 128 | 6.51 | 384, 768, 1536 | 78.12 | 80, 160, 320 | 16.28 | 23.07 |
| 1 | 64, 128, 256 | 13.02 | 512, 1024, 2048 | 104.18 | 80, 160, 320 | 16.28 | 24.45 |
| 2 | 96, 192, 284 | 19.53 | 640, 1280, 2560 | 130.21 | 80, 160, 320 | 16.28 | 25.83 |
| 3 | 128, 256, 512 | 26.04 | 768, 1536, 3072 | 156.25 | 80, 160, 320 | 16.28 | 27.20 |

FIG. 5

CONFIGURABLE GUARD TIME FOR WIRELESS NETWORKS

PRIORITY CLAIM AND CROSS REFERENCE TO RELATED APPLICATION

This application claims the benefit of the priority of U.S. Provisional Application Ser. No. 61/041,190, filed Mar. 31, 2008 and entitled "Efficient use of guard time in UMB TDD networks," the entire contents of which are hereby incorporated by reference.

BACKGROUND

This application relates to wireless communications.

Wireless communication systems can include a network of one or more base stations to communicate with mobile station (MS) such as a wireless device, a mobile device, cell phone, or wireless air card. A mobile station can be referred to as a user equipment (UE) or subscriber station (SS). In some implementations, a wireless communication system covers a certain geographic area by dividing the area into radio cells, each cell can include one or more sectors. A base station can provide wireless coverage in a radio cell. Further, a wireless communication system can include a core network to control the base stations.

A base station can transmit a signal on a forward link (FL), called a downlink signal, to one or more mobile stations. A mobile station can transmit a signal on a reverse link (RL), called an uplink signal, to one or more base stations. Types of wireless communication techniques used by base stations and mobile stations include Frequency Division Duplex (FDD) and Time Division Duplex (TDD).

Wireless FDD systems support downlink and uplink transmissions on different frequency channels. For example, the FL and RL are assigned to different frequency channels with little or no interference between the channels. Therefore, a BS can transmit signals to mobile stations on the FL independently while a mobile station sends signals to a serving BS on the RL.

Wireless TDD systems support downlink and uplink transmissions on the same carrier frequency in separate non-overlapping time intervals. For example, the FL and RL are assigned to the same frequency channel. A wireless communication system can allocate downlink and uplink intervals to control downlink and uplink transmissions in one or more frames. When switching between downlink and uplink transmissions, TDD systems can use a guard period (GP) as a buffer between different transmissions. Wireless systems can use a frame structure to control downlink and uplink transmissions and guard periods. A frame structure can specify locations or intervals within a frame for downlink and uplink transmissions and guard periods.

In some implementations, a frame can include multiple FL slots and RL slots. In some implementations, a frame can include multiple PHY frames for data transmissions. A BS can transmit signals to MSs on FL slots while MSs are scheduled to receive signals in the FL slots. Likewise, a MS can transmit signals to a BS on RL slots while the BS is scheduled to receive signals in the RL slots. FL slots and RL slots can alternate in the time domain and can repeat every frame to allow both the BS and the MSs an opportunity to transmit and receive signals.

A wireless TDD system can combine a TDD technique with a multiple access technology such as Code Division Multiple Access (CDMA) or Orthogonal Frequency-Division Multiplexing (OFDM). Examples of wireless TDD systems include wireless communications networks based on 3GPP2 Radio Transmission Technologies (RTT), Ultra Mobile Broadband (UMB) TDD, Time Division-Synchronous Code Division Multiple Access (TD-SCDMA), Long Term Evolution (LTE) TDD mode, and IEEE 802.16 WiMAX TDD mode.

SUMMARY

This patent application describes, among other things, technologies for operating a wireless communication system with a configurable guard time.

In one aspect, techniques for wireless communications can include operating a wireless communication system that provides multiple guard time values for different deployment configurations, mapping the guard time values to cyclic prefix (CP) values to reduce an acquisition complexity and reduce an initial synchronization time of a mobile station, and communicating a selected guard time value to a mobile station by transmitting a signal using a cyclic prefix value corresponding to the selected guard time value. Other implementations can include corresponding systems, apparatus, and computer program products.

These and other implementations can include one or more of the following features. Mapping the guard time values can include mapping a guard time to a respective CP value proportionally by mapping a small guard time corresponding to a small CP value and a large guard time to a large CP value. Implementations can include operating a mobile station to process at least a portion of the signal to determine a CP value; and determining a guard time value based on the mapping and the determined CP value. Implementations can include operating a mobile station to decode a CP value from the signal, determining a guard time value for a forward-link (FL) to reverse-link (RL) transition, and determining a superframe duration in use in the wireless communication system based on the determined guard time value.

In another aspect, techniques can include configuring a base station with a guard time value selected from a multiple guard time values, generating a cyclic prefix whose length is indicative of the selected guard time with the cyclic prefix based on communication data; and communicating the cyclic prefix and the communication data to a mobile station to operate the mobile station to determine the selected guard time based on the length of the cyclic prefix. The base station can communicate with one or more mobile stations using a time division duplex communication channel. Other implementations can include corresponding systems, apparatus, and computer program products.

These and other implementations can include one or more of the following features. Communicating the cyclic prefix can include broadcasting a signal indicative of the cyclic prefix and the communication data. The cyclic prefix can be based on a portion of the information. Implementations can include using the selected guard time to select a cyclic prefix length from a data structure and generating the cyclic prefix can include using the selected cyclic prefix length. Implementations can include determining a cyclic prefix length from the selected guard time via a mathematical relationship and generating the cyclic prefix can include using the determined cyclic prefix length.

In another aspect, techniques for guard time determination can include receiving a signal from a base station over a time division duplex communication channel with the signal including a cyclic prefix and communication data, determining a unique guard time value based on a length of the cyclic prefix; and after receiving the signal, transmitting a signal to the base station in accordance with the guard time value. The cyclic prefix can be based on at least a portion of the communication data. Other implementations can include corresponding systems, apparatus, and computer program products.

These and other implementations can include one or more of the following features. Determining the unique guard time value can include using the length of the cyclic prefix to select a guard time value from a data structure. Determining the unique guard time value can include calculating the unique guard time based on the length of the cyclic prefix. Implementations can include decoding at least a portion of the signal to determine the length of the cyclic prefix; and using the unique guard time for a forward-link to reverse-link transition. Implementations can include determining a superframe duration based on the length of the cyclic prefix; and communicating with the base station in accordance with the superframe duration. Transmitting the signal can include operating a transmitter to transmit a signal in accordance with the guard time value.

In another aspect, apparatuses and systems can include transceiver circuitry to communicate with a base mobile station over a time division duplex communication channel; and processing circuitry, in communication with the transceiver circuitry, configured to perform operations including processing a signal from the base station, the signal including a cyclic prefix and communication data where the cyclic prefix is based on at least a portion of the communication data; determining a unique guard time value based on a length of the cyclic prefix; and transmitting a signal to the base station in accordance with the guard time value.

These and other implementations can include one or more of the following features. Determining the unique guard time value can include using the length of the cyclic prefix to select a guard time value from a data structure. Determining the unique guard time value can include calculating the unique guard time based on the length of the cyclic prefix. The operations can further include decoding at least a portion of the signal to determine the length of the cyclic prefix; and using the unique guard time for a forward-link (FL) to reverse-link (RL) transition. The operations can further include determining a superframe duration based on the length of the cyclic prefix; and communicating with the base station in accordance with the superframe duration. In some implementations, the processing circuitry can include at least a portion of the transceiver circuitry.

In another aspect, wireless systems can include one or more mobile stations configured to communicate over a time division duplex communication channel; and a base station in communication with the one or more mobile station. In some implementations, the base station is configured to perform operations including: accessing a guard time value selected from a plurality of guard time values; generating a cyclic prefix whose length is indicative of the selected guard time, where the cyclic prefix is based on communication data; and transmitting a signal indicative of the cyclic prefix and the communication data to the mobile station to operate the mobile station to determine the selected guard time based on the length of the cyclic prefix. In some implementations, a mobile station is configured to perform operations including processing the signal from the base station to decode a cyclic prefix; determining a unique guard time value based on a length of the decoded cyclic prefix; and transmitting a signal to the base station in accordance with the unique guard time value.

Particular implementations of the subject matter described in this patent application can be implemented to realize one or more of the following potential advantages. A mobile station can determine a TDD wireless system's guard time setting based on a cyclic prefix length. Mapping guard time values with corresponding cyclic prefix length values can reduce a mobile station acquisition and synchronization complexity. A mapping technique can reduce a mobile station's acquisition time by reducing the number of independent parameters in a multi-dimensional configuration space that includes cyclic prefix and guard time settings.

These and other aspects and their implementations are set forth in the accompanying drawings, the description and the claims.

BRIEF DESCRIPTION OF THE DRAWINGS

FIG. 5 shows an example of different system configurations that map a cyclic prefix value to a guard time value.

Like reference symbols in the various drawings indicate like elements.

DETAILED DESCRIPTION

Radio stations such as a base station or a mobile station can transmit at different times over a TDD communication channel to avoid interfering with the transmissions of others. However, there may be a communication delay such as a delay in a radio station's ability to complete a transmission, e.g., switching off a transmitter or a transceiver, or a delay in signal propagation between radio stations. A TDD system can use a guard time to compensate for such delays. If a forward link or a reverse link transmission extends pass the allocated time interval, the guard time can provide a buffer to absorb the overrun.

For example, alternating between FL and RL slots in a TDD-based frame without using guard times may result in interference between FL and RL signals for one or more of the following reasons. In some implementations, there is latency in the electronic hardware when switching from FL to RL or from RL to FL operations. This latency can be referred to as the RF system switching time. A signal transmission extending into the RF switching period from FL to RL or RL to FL may result in a signal quality issue or result in interference between FL and RL transmissions. Further, there is propagation delay for a MS to receive a signal transmitted by a BS. This propagation delay may cause a time difference on FL/RL slots between the BS and the MS and may result in an overlapping between FL and RL signals during the transition period, e.g., switching period. A greater propagation delay may result in a greater overlap in a FL to RL transition period. Because the propagation delay can depend on a deployment scenario and the corresponding RF environment, the overlapping may be more severe in some deployment scenarios.

Figure 1:
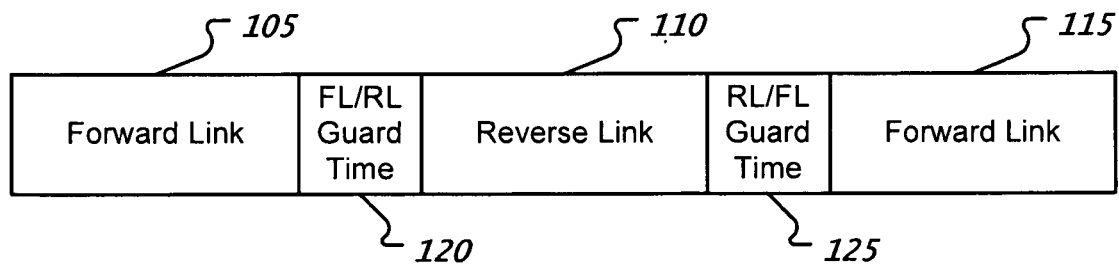
FIG. 1 shows an example of a frame structure including guard times.

FIG. 1 shows an example of a frame structure, including guard times, for a TDD communication channel. Radio stations can transmit and receive data over a TDD communication channel using a frame structure that specifies locations or intervals within a frame for downlink and uplink transmissions and guard times. A base station can transmit data on a forward link (FL) 105, 115 to one or more mobile stations. A mobile station(s) can transmit data to a base station on a reverse link (RL) 110. Guard time intervals 120, 125 can separate forward link 105, 115 and reverse link 110 communications. A FL/RL guard time interval 120 separating a forward link communication 105 from a reverse link communication 110 can have a different duration than a RL/FL guard time interval 125 separating a reverse link communication 110 from a forward link communication 115.

TDD systems can transmit, in addition to communication data, a cyclic prefix (CP) to compensate for inter-symbol interference (ISI) and multipath interference. In some implementations, a CP includes a copy of a portion of corresponding communication data. In some TDD systems, a frame structure can include multiple physical frames. For example, a superframe structure can include a superframe preamble followed multiple physical frames. In some implementations, a physical frame can include eight OFDM symbols, each of which has a cyclic prefix (CP) to compensate for inter-symbol interference (ISI) and multipath interference. Different wireless conditions can exhibit different multipath interference. For example, a longer multipath difference may require a longer CP. Moreover, a wireless system's superframe duration can depend on a CP length in used in the system. Accordingly, a different CP length can result in a different superframe duration.

Figure 2:
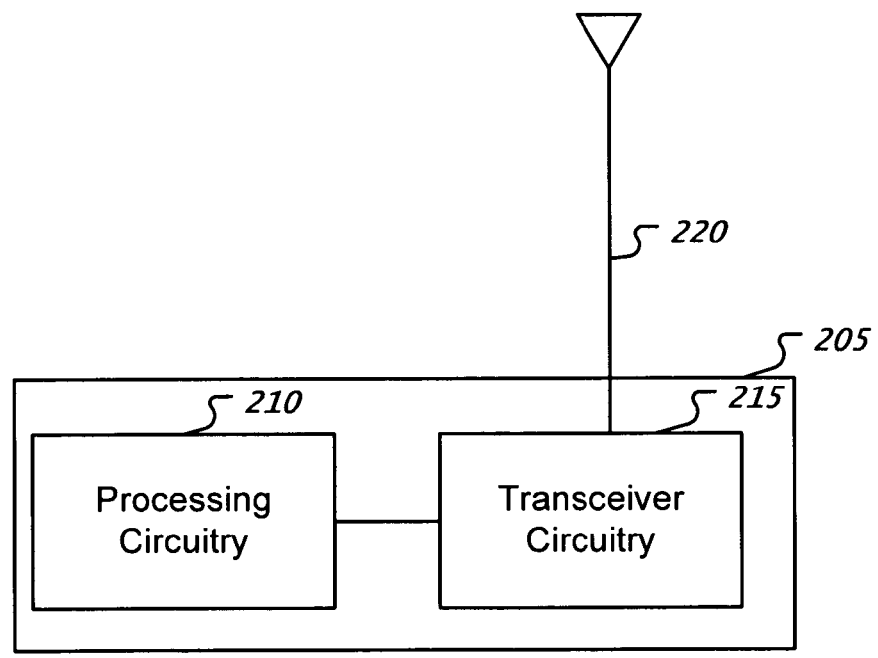
FIG. 2 shows an example of a radio station architecture.

FIG. 2 shows an example of a radio station architecture. A radio station 205 such as a base station or a mobile station can include processing circuitry 210 and transceiver circuitry 215. Processing circuitry 210 can include one or more processing units configured to perform one or more operations or techniques described herein. In some implementations, processing circuitry 210 can include one or more specialized or general propose processors and/or specialized logic. A radio station 205 can include transceiver circuitry 215 to send and/or receive wireless signals over a communication interface such as antenna 220. Radio station 205 can include additional communication interfaces for transmitting and receiving data. In some implementations, a radio station 205 can include multiple antennas for multiple in multiple out (MIMO) operations. In some implementations, processing circuitry 210 can include and/or implement the functionality of transceiver circuitry 215.

Figure 3:
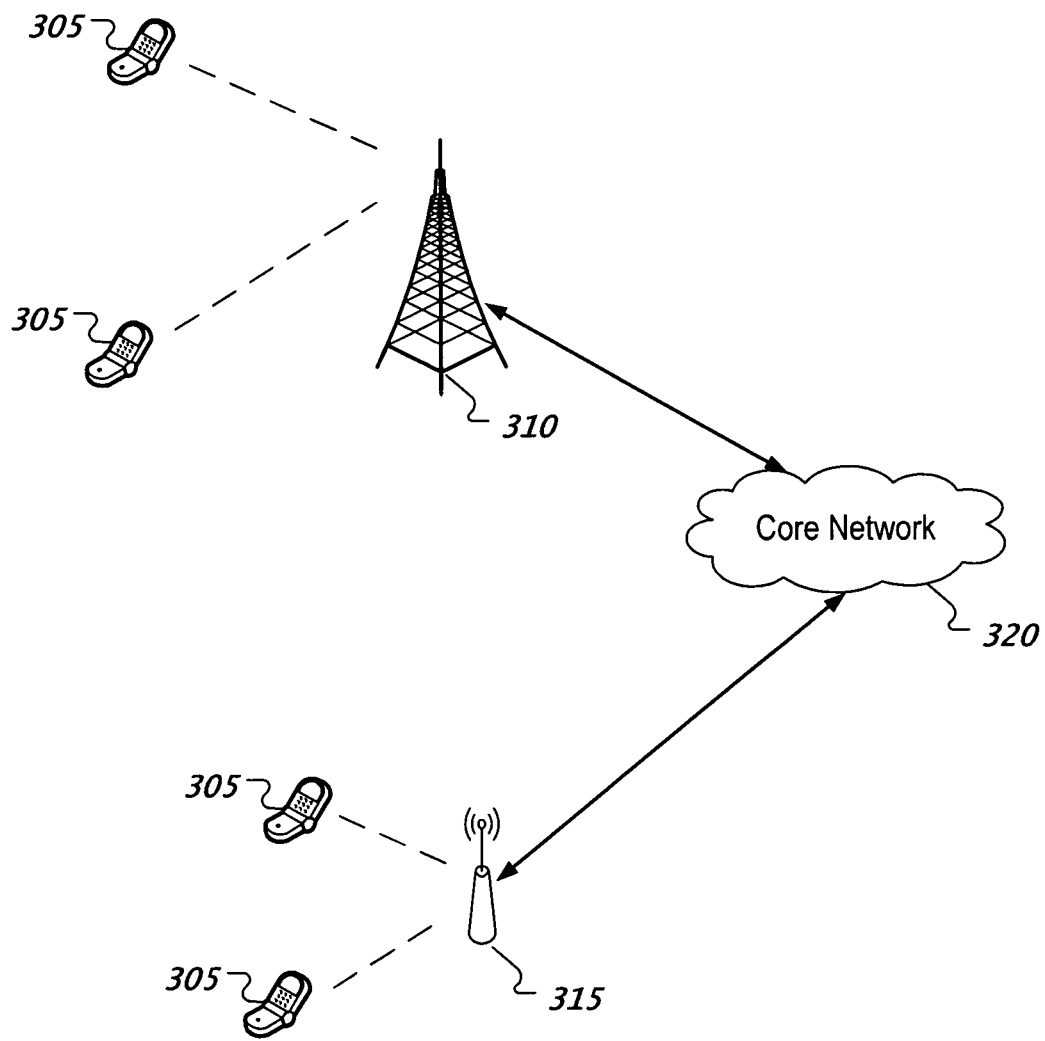
FIG. 3 shows an example of a wireless communication system using different guard times.

FIG. 3 shows an example of a wireless communication system using different guard times. A wireless communication system, such as a TDD wireless communication system, can include one or more base stations (BSs) 310, 315 for communicating with one or more mobile stations 305 such as subscriber stations, mobile device, user equipment, wireless air cards, mobile phones, mobile computers, Personal Digital Assistants (PDAs), and other wireless devices. A mobile station can have a fixed location, e.g., a desktop computer with a wireless air card, or can be movable. In some implementations, a system can include a core network 320. A core network 320 can include one or more controllers to control one or more base stations 310, 315. A controller can include processor electronics such as a processor(s) or specialized logic. A controller's functionality can be split into multiple components within a core network 320. In some implementations, a TDD wireless communication system can combine a TDD technique with a multiple access technology such as Code Division Multiple Access (CDMA) or Orthogonal Frequency-Division Multiplexing (OFDM). Examples of TDD wireless communication systems include Ultra Mobile Broadband (UMB) TDD, Time Division-Synchronous Code Division Multiple Access (TD-SCDMA), Long Term Evolution (LTE) TDD mode, and IEEE 802.16 WiMAX TDD mode.

A TDD based wireless communication system can use different guard times between uplink and downlink communications, e.g., switching between forward link and reverse link communications versus switching between reverse link and forward link communications. For example, a TDD system can include one or more FL to RL guard times and one or more RL to FL guard times in a frame structure. A RL to FL guard time value can depend on a switching time, e.g., switching time of transmission circuitry, radio frequency (RF) switching time, or switching between transmitting and receiving. In some implementations, a fixed value is used for a RL to FL guard time value, because variations in RF switching time can be minimal. A FL to RL guard time value can depend on a RF switching time and a transmission Round Trip Delay (RTD) between a BS and a MS. However, different base station deployment scenarios can exhibit different propagation delays. For example, a base station 310 covering a large area may have a larger RTD than a base station 315 such as a femtocell covering a smaller area. As a result of different deployment scenarios, e.g., different coverage area sizes, type of base station, and/or RF conditions, a single guard time value may not be optimal for different types of scenarios. Accordingly, a base station 310 covering a larger area can operate using a larger guard time value than a base station 315 covering a smaller area.

To address these issues, TDD systems such as TD-SCDMA, LTE TDD mode, UMB TDD, and WiMAX TDD mode feature a guard time (GT) interval between the transitions from FL to RL and from RL to FL to prevent FL and RL signal overlaps. The guard time for the transition from FL to RL can depend on a Round Trip Delay (RTD) between a BS and a MS and a RF switching time. The guard time for the transition from RL to FL can depend on a RF switching time. In LTE TDD mode and WiMAX TDD systems, the guard time is configurable. In some wireless systems, such as UMB TDD and TD-SCDMA, the guard time from FL to RL has a fixed value. For example, UMB TDD defines the guard time from FL to RL to be 78.12 µs. Such a static, non-configurable value may not meet a large cell deployment requirement. Moreover, one guard time value may not provide optimal system performance across different deployment scenarios. For example, one guard time value may not cover multiple deployment scenarios such as macro cells, micro cells, pico cells, and femto cells deployments.

When entering a coverage area or powering on therein, a mobile station may need to determine the guard time in use by the wireless system providing the coverage. Furthermore, the mobile station may need to determine a frame or superframe duration before communicating with a base station. Moreover, a TDD system can have a configurable setting for CP length to address different deployment scenarios. In some implementations, a frame or superframe duration is not only determined by CP length value but also by the guard time value. In a TDD system where the guard time and CP value are configurable parameters, the superframe duration can depend on both the specific configuration of the CP value and the guard time value. This two-dimensional configuration parameter space may increase the complexity of a mobile station's initial acquisition of a base station's signal and may increase the acquisition time when compared to a system with only one of the two values being configurable.

To solve this problem and to reduce the complexity for a mobile station to perform an initial acquisition and synchronization with a base station, the subject described herein provides examples of mapping techniques between guard time values and CP values. For example, if a mobile station can determine a TDD wireless system's CP value, then the mobile station can determine the system's guard time value based on a mapping technique. In some implementations, a mapping technique is based on the characteristics of CP and GT parameter space. A deployment scenario with a larger cell size may require a larger GT value for the FL to RL transition. Likewise, a deployment scenario with a larger cell size may require a longer CP to address for a larger difference of multi-paths. Therefore, a large GT value can map to a large CP value, while a small GT value can map to a small CP value. A mathematical relationship or a data structure such as a look-up table can provide the mappings between GT and CP values. Once a mobile station decodes a signal to determine the length of a CP, a mobile station can apply the mapping technique to determine the GT value, and the frame or superframe duration. Thus, a mapping between GT and CP values can reduce a mobile station's acquisition and synchronization's complexity from two dimensions to one dimension.

In some implementations, a mobile station 305 can move between differently configured base stations 310, 315 with different guard time settings. In order to communicate with a base station 310, 315, a mobile station 305 can monitor a transmission from the base station 310, 315 to determine a CP length. Using the CP length and a CP to GT mapping technique, the mobile station 305 can determine a guard time value to use with the base station 310, 315.

Figure 4A:
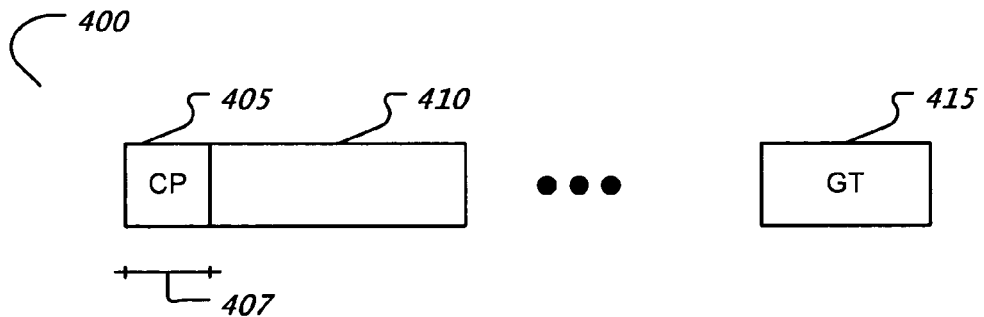
FIGS. 4A, 4B, and 4C show different examples of frame structures with different cyclic prefix lengths and different guard time durations.
Figure 4B:
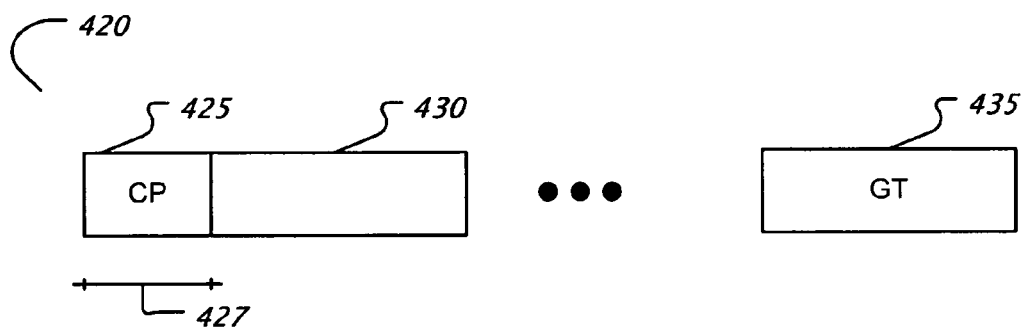
Figure 4C:
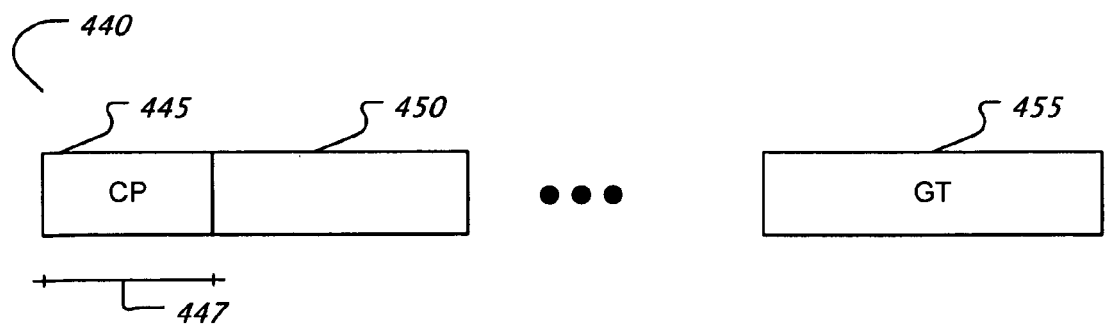

FIGS. 4A, 4B, and 4C show different examples of frame structures with different cyclic prefix lengths and different guard time durations. A frame structure 400, 420, 440 can include one or more of downlink and uplink transmissions and intervals for guard times. A frame structure 400, 420, 440 can include additional symbols and guard time intervals. In some implementations, a cyclic prefix (CP) 405, 425, 445 can include a portion of a corresponding symbol 410, 430, 450.

Different cyclic prefix lengths 407, 427, 447 can correspond to different guard time durations 415, 435, 455. In FIG. 4A, a frame structure 400 can include a symbol 410 with a CP 405, of a specific length 407, and a guard time interval 415. The length 407 of the CP 405 can determine the length of a guard time interval 415. In FIG. 4B, a frame structure 420 can include a symbol 430 with a CP 425, of a different length 427, and a guard time interval 435. The length 427 of the CP 425 can determine the length of a guard time interval 435. In FIG. 4C, a frame structure 440 can include a symbol 450 with a CP 445, of yet a different length 447, and a guard time interval 455. The length 447 of the CP 445 can determine the length of a guard time interval 455. In other words, some implementations can signal a length of a guard time interval by a length of a cyclic prefix.

FIG. 5 shows an example of different system configurations that map a cyclic prefix value to a guard time value. A TDD wireless system can include different configuration modes for different deployment scenarios. FIG. 5 shows four different configuration modes. Each mode maps a CP length value to a FL/RL guard time value, RL/FL guard time value, and a superframe duration value. Within each mode, different values are shown for different Fast Fourier Transformation (FFT) lengths, e.g., 512, 1024, and 2048. Different mappings are realizable within a wireless system and between different wireless systems.

Figure 6:
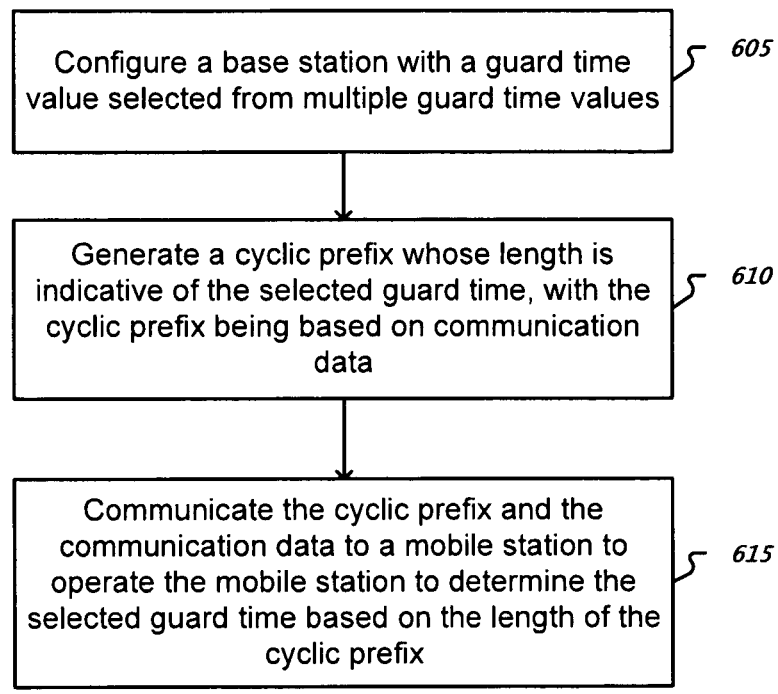
FIG. 6 shows an example of a process to communicate a guard time value via a cyclic prefix length.

FIG. 6 shows an example of a process to communicate a guard time value via a cyclic prefix length. A process on a base station or on a core network can configure 605 a base station with a guard time value selected from multiple guard time values. For example, during startup, a base station can access a data structure such as a configuration file or memory to retrieve a selected guard time value or receive a guard time value over a network. The base station can then configure itself using the selected guard time value. In some implementations, configuration can include setting a length for cyclic prefix generation based on the selected guard time value. In some implementations, the base station can use the selected guard time to select a cyclic prefix length from a data structure. In some implementations, the base station can determine a cyclic prefix length from the selected guard time via a mathematical relationship.

The base station can generate 610 a cyclic prefix whose length is indicative of the selected guard time. In processing communication data for transmission, the base station can generate a cyclic prefix using a portion of the communication data. The base station can communicate 615 the cyclic prefix and the communication data to a mobile station to operate the mobile station to determine the selected guard time based on the length of the cyclic prefix.

In some implementations, a base station can receive communication data for a mobile station, and can generate a cyclic prefix based on the communication data and the cyclic prefix length setting. The base station can transmit the cyclic prefix and the communication data to the mobile station. In some implementations, the communication data can include control and/or signaling data. In some implementations, the communication data can include user data.

Figure 7:
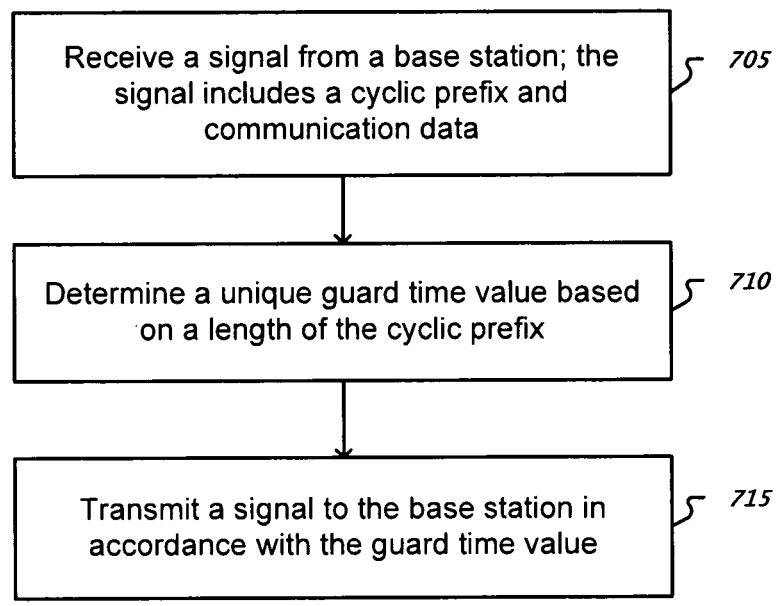
FIG. 7 shows an example of a guard time determination process that determines a guard time based on a received signal.

FIG. 7 shows an example of a guard time determination process that determines a guard time based on a received signal. A mobile station can receive 705 a signal from a base station. The signal can include a cyclic prefix and communication data where the cyclic prefix is based on at least a portion of the communication data. The signal can include additional pairings of cyclic prefix and corresponding communication data. The mobile station can decode at least a portion of the signal to determine the cyclic prefix and the length of the cyclic prefix.

The mobile station can determine 710 a unique guard time value based on the length of the cyclic prefix. In some implementations, a mobile station can lookup a guard time value in a data structured indexed by cyclic prefix length. In some implementations, a mobile station can calculate the guard time value using a mathematical relationship between cyclic prefix length and guard time value. In some implementations, a mobile station can perform a first guard time determination for a FL to RL transition. In some implementations, a mobile station can perform a second guard time determination for a RL to FL transition. Additionally, a mobile station can compute the duration of a superframe using the cyclic prefix length.

The mobile station can transmit 715 a signal to the base station in accordance with the guard time value. If a mobile station moves to a different base station, the mobile station can repeat the guard time determination process to determine the guard time value corresponding to the base station.

The disclosed and other embodiments and the functional operations described in this patent application can be implemented in digital electronic circuitry, or in computer software, firmware, or hardware, including the structures disclosed in this patent application and their structural equivalents, or in combinations of one or more of them. The disclosed and other embodiments can be implemented as one or more computer program products, i.e., one or more modules of computer program instructions encoded on a computer readable medium for execution by, or to control the operation of, data processing apparatus. The computer readable medium can be a machine-readable storage device, a machine-readable storage substrate, a memory device, a composition of matter effecting a machine-readable propagated signal, or a combination of one or more them. The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them. A propagated signal is an artificially generated signal, e.g., a machine-generated electrical, optical, or electromagnetic signal, that is generated to encode information for transmission to suitable receiver apparatus.

A computer program (also known as a program, software, software application, script, or code) can be written in any form of programming language, including compiled or interpreted languages, and it can be deployed in any form, including as a stand alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this patent application can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Computer readable media suitable for storing computer program instructions and data include all forms of non volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

While this specification contains many specifics, these should not be construed as limitations on the scope of an invention that is claimed or of what may be claimed, but rather as descriptions of features specific to particular embodiments. Certain features that are described in this specification in the context of separate embodiments can also be implemented in combination in a single embodiment. Conversely, various features that are described in the context of a single embodiment can also be implemented in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or a variation of a sub-combination. Similarly, while operations are depicted in the drawings in a particular order, this should not be understood as requiring that such operations be performed in the particular order shown or in sequential order, or that all illustrated operations be performed, to achieve desirable results.

Only a few examples and implementations are disclosed. Variations, modifications and enhancements to the described examples and implementations and other implementations can be made based on what is disclosed. For example, some wireless systems may have different terminologies for aspects discussed above. For example, a slot can be named or can include a subframe or a frame in some wireless system. Further, in some wireless systems where a slot includes a frame, a superframe can include multiple such slots. Different TDD systems may have different protocol interpretations for the technologies described herein.

What is claimed is:

1. A method for wireless communications comprising:
operating a wireless communication system that provides multiple guard time options for different deployment configurations, wherein the multiple guard time options have different guard time values from one another for a corresponding transition from a forward link (FL) to a reverse link (RL);
mapping the guard time values to cyclic prefix (CP) values to obtain information on relationship between guard time values and cyclic prefix values and reduce an acquisition complexity and reduce an initial synchronization time of a mobile station;
providing the information on relationship between guard time values and cyclic prefix values to a mobile station;
generating a cyclic prefix whose length is indicative of a selected guard time, wherein the cyclic prefix is based on communication data; and
communicating the cyclic prefix and the communication data to the mobile station to operate the mobile station to determine the selected guard time based on the length of the cyclic prefix.

2. The method of claim 1, wherein mapping the guard time values comprises:
mapping a guard time to a respective CP value proportionally by mapping a small guard time corresponding to a small CP value and a large guard time to a large CP value.

3. The method of claim 1, further comprising:
operating a mobile station to process at least a portion of the signal to determine a CP value; and
determining a guard time value based on the mapping and the determined CP value.

4. The method of claim 1, further comprising:
operating a mobile station to decode a CP value from the signal;
determining a guard time value for a forward-link (FL) to reverse-link (RL) transition based on the CP value; and determining a superframe duration in use in the wireless communication system based on the determined guard time value.

5. The method of claim 1, further comprising:
configuring a base station with a guard time value, corresponding to a forward-link to reverse link-transition, selected from the multiple guard time options, wherein the base station communicates with one or more mobile stations using a time division duplex communication channel.

6. The method of claim 5, wherein communicating the cyclic prefix comprises broadcasting a signal indicative of the cyclic prefix and the communication data, wherein the cyclic prefix is based on a portion of the communication data.

7. The method of claim 5, further comprising:
using the selected guard time to select a cyclic prefix length from a data structure, wherein generating the cyclic prefix comprises using the selected cyclic prefix length.

8. The method of claim 5, further comprising:
determining a cyclic prefix length from the selected guard time via a mathematical relationship, wherein generating the cyclic prefix comprises using the determined cyclic prefix length.

9. A method comprising:
receiving a signal from a base station over a time division duplex communication channel in a time division duplex system that provides multiple guard time options for different deployment configurations, wherein the multiple guard time options have different guard time values from one another for a respective transition from a forward link (FL) to a reverse link (RL), and wherein the signal comprises communication data and a cyclic prefix which is based on at least a portion of the communication data;
decoding the received signal and determining a length of the cyclic prefix;
determining a unique guard time value based on the determined length of the cyclic prefix;
after receiving the signal, transmitting a signal to the base station in accordance with the guard time value;
determining a superframe duration based on the length of the cyclic prefix; and
communicating with the base station in accordance with the superframe duration.

10. The method of claim 9, wherein determining the unique guard time value comprises using the length of the cyclic prefix to select a guard time value from a data structure.

11. The method of claim 9, wherein determining the unique guard time value comprises calculating the unique guard time based on the length of the cyclic prefix.

12. The method of claim 9, further comprises:
decoding at least a portion of the signal to determine the length of the cyclic prefix; and
using the unique guard time for a forward-link to reverse-link transition.

13. The method of claim 9, wherein transmitting the signal comprises operating a transmitter to transmit a signal in accordance with the guard time value.

14. An apparatus comprising:
transceiver circuitry to communicate with a base station over a time division duplex communication channel in a time division duplex system providing multiple guard time options for different deployment configurations, wherein the multiple guard time options have different guard time values from one another for a transition from a forward link (FL) to a reverse link (RL); and
processing circuitry, in communication with the transceiver circuitry, configured to perform operations comprising:
processing a signal from the base station, the signal comprising a cyclic prefix and communication data, wherein the cyclic prefix is based on at least a portion of the communication data;
determining a unique guard time value based on a length of the cyclic prefix;
transmitting a signal to the base station in accordance with the guard time value;
decoding at least a portion of the signal to determine the length of the cyclic prefix; and
using the unique guard time for a forward-link (FL) to reverse-link (RL) transition.

15. The apparatus of claim 14, wherein determining the unique guard time value comprises using the length of the cyclic prefix to select a guard time value from a data structure.

16. The apparatus of claim 14, wherein determining the unique guard time value comprises calculating the unique guard time based on the length of the cyclic prefix.

17. The apparatus of claim 14, wherein the operations further comprise:
determining a superframe duration based on the length of the cyclic prefix; and
communicating with the base station in accordance with the superframe duration.

18. The apparatus of claim 14, wherein the processing circuitry comprises at least a portion of the transceiver circuitry.

19. A system comprising:
transceiver circuitry to communicate with a mobile station configured to communicate over a time division duplex communication channel in a time division duplex system providing multiple guard time options for different deployment configurations, wherein the multiple guard time options have different guard time values from one another for a transition from a forward link (FL) to a reverse link (RL); and
processing circuitry in communication with the transceiver circuitry configured to perform operations comprising:
accessing a guard time value selected from a plurality of guard time values corresponding to multiple forward-link to reverse link-transitions;
generating a cyclic prefix whose length is indicative of the selected guard time, wherein the cyclic prefix is based on communication data; and
transmitting a signal indicative of the cyclic prefix and the communication data to the mobile station to operate the mobile station to determine the selected guard time based on the length of the cyclic prefix.

20. The system of claim 19, wherein the operations further comprise:
using the selected guard time to select a cyclic prefix length from a data structure, wherein generating the cyclic prefix comprises using the selected cyclic prefix length.

21. The system of claim 19, wherein the operations further comprise:
determining a cyclic prefix length from the selected guard time via a mathematical relationship, wherein generating the cyclic prefix comprises using the determined cyclic prefix length.

22. The system of claim 19, wherein the mobile station is configured to perform operations comprising:
processing the signal from the base station to decode a cyclic prefix;

determining a unique guard time value based on a length of the decoded cyclic prefix; and transmitting a signal to the base station in accordance with the unique guard time value.

* * * * *